June 16, 1925.
W. R. WATROUS
1,542,428
MACHINE FOR TURNING BLANKS FOR CROCHET HOOKS AND OTHER ARTICLES
Filed July 11, 1923     4 Sheets-Sheet 3
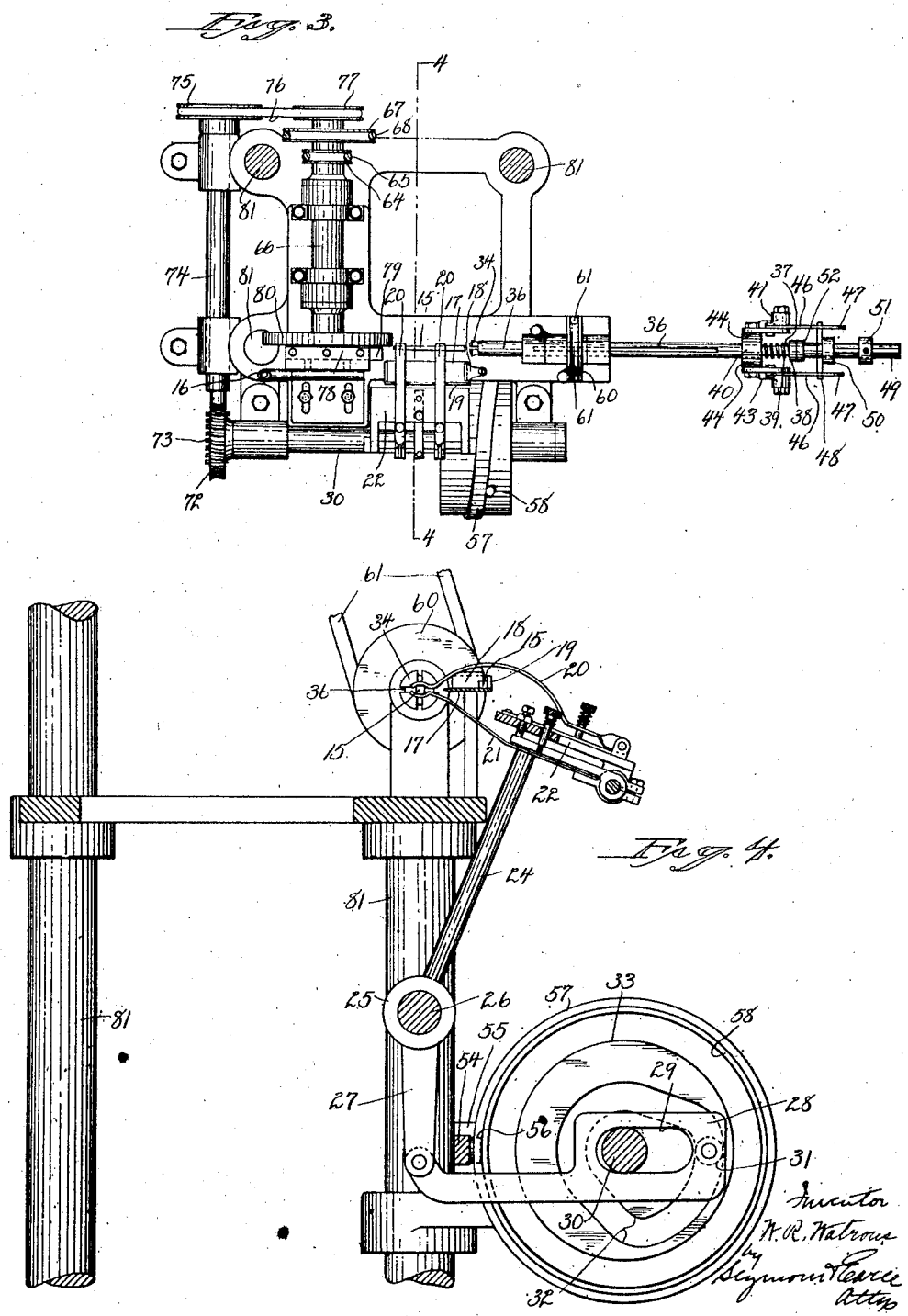

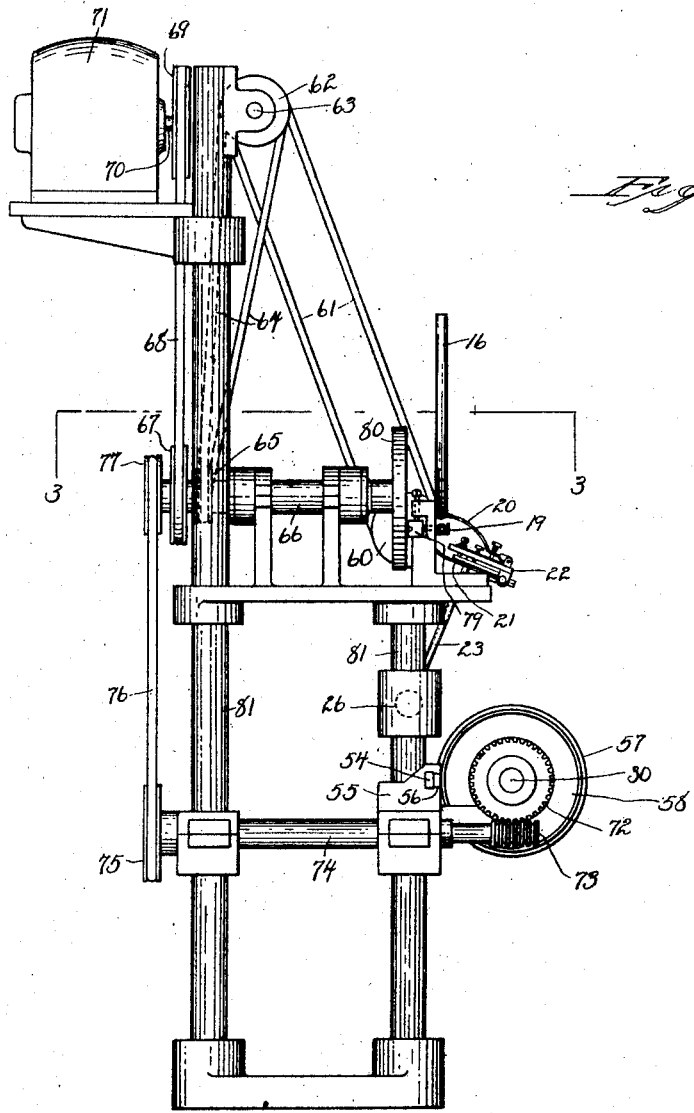

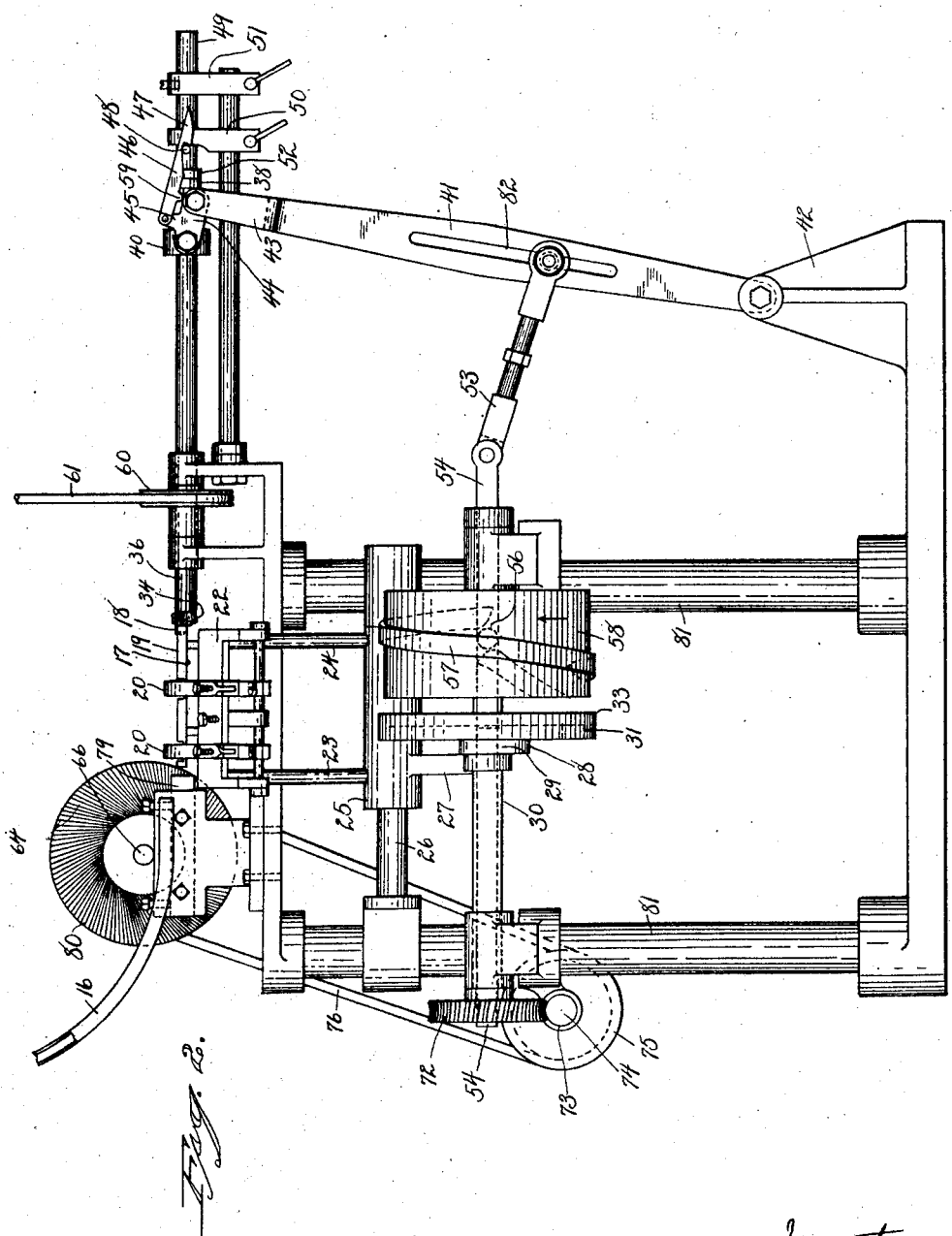

June 16, 1925.  
W. R. WATROUS  
1,542,428  
MACHINE FOR TURNING BLANKS FOR CROCHET HOOKS AND OTHER ARTICLES  
Filed July 11, 1923  
4 Sheets-Sheet 4
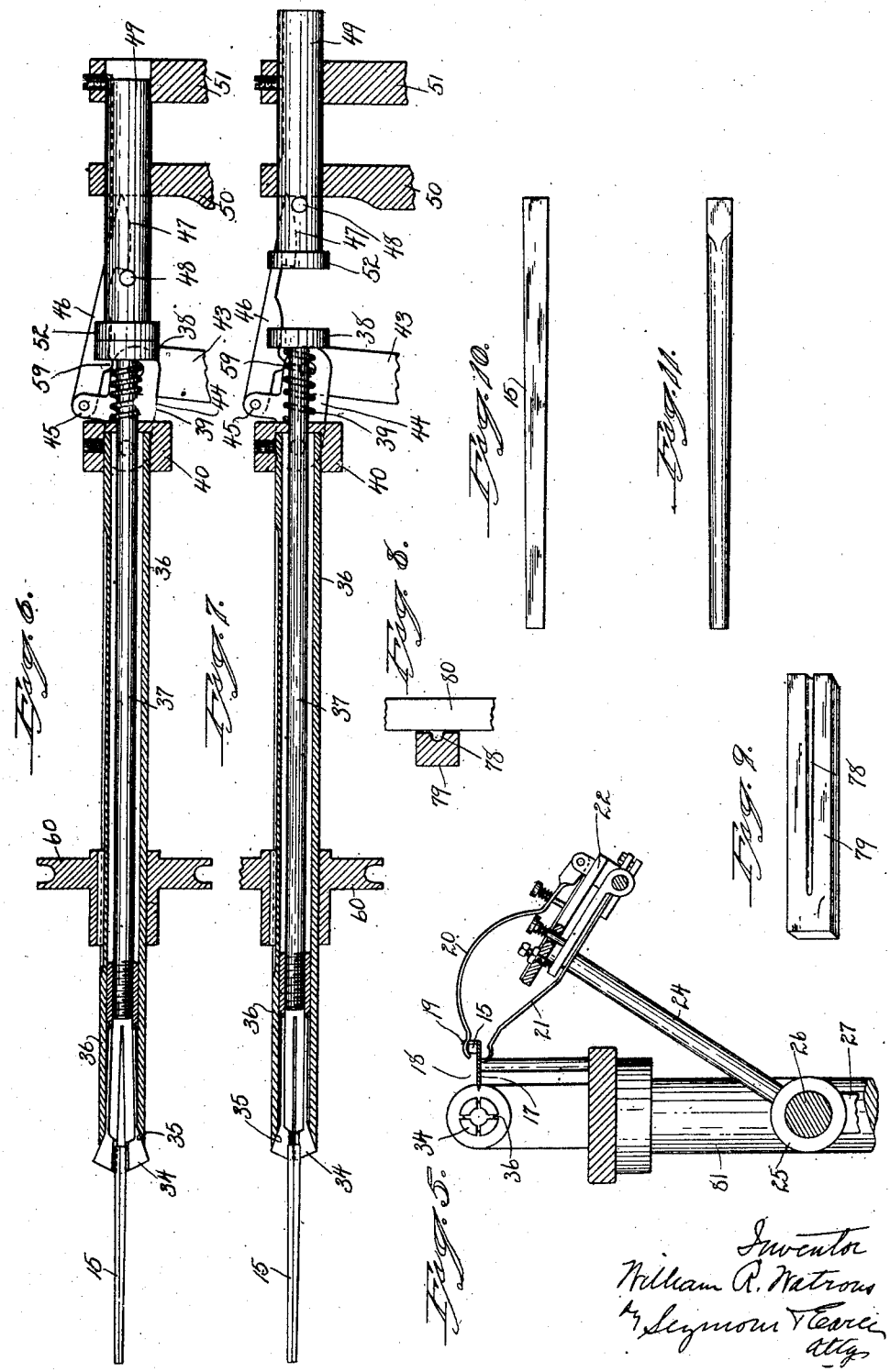

Patented June 16, 1925.

1,542,428

UNITED STATES PATENT OFFICE.

WILLIAM R. WATROUS, OF CHESTER, CONNECTICUT, ASSIGNOR TO C. J. BATES & SON, OF CHESTER, CONNECTICUT, A FIRM COMPOSED OF CARLTON J. BATES AND HAMILTON C. BATES.

MACHINE FOR TURNING BLANKS FOR CROCHET HOOKS AND OTHER ARTICLES.

Application filed July 11, 1923. Serial No. 650,853.

*To all whom it may concern:*

Be it known that I, WILLIAM R. WATROUS, a citizen of the United States, residing at Chester, in the county of Middlesex and State of Connecticut, have invented a new and useful Improvement in Machines for Turning Blanks for Crochet Hooks and Other Articles; and I do hereby declare the following, when taken in connection with the accompanying drawings and the characters of reference marked thereon, to be a full, clear, and exact description of the same, and which said drawings constitute part of this application, and represent, in—

Fig. 1 a side view of a machine for turning crochet hook blanks constructed in accordance with my invention.

Fig. 2 a view in front elevation on an enlarged scale, the motor and standards for it being broken away.

Fig. 3 a sectional view on the line 3—3 of Fig. 1.

Fig. 4 an enlarged, broken detail view, showing the gripping-jaws presenting a blank to the chuck.

Fig. 5 a broken view, showing the jaws ready to advance a blank to the chuck.

Fig. 6 a broken sectional view of the chuck mechanism with the jaws in open position.

Fig. 7 a similar view, with the jaws in closed position.

Fig. 8 a sectional view of the bearing-block, showing its relation to the mounting-wheel.

Fig. 9 a perspective view of the bearing-block detached.

Fig. 10 a plan view of a blank, preparatory to turning.

Fig. 11 a similar view of the blank turned.

This invention relates to improvement in machines for turning blanks for crochet hooks and other articles, such as stilettos, manicure sticks, etc. The pieces of bone, wood, or other material are first cut into tapered lengths, square in cross-section, and the next step in the process is to turn these blanks into tapered form, round in cross-section, and the object of this invention is to provide an automatic machine for turning the blanks, and the invention consists in the construction as hereinafter described and particularly recited in the claims.

The invention will be best understood by describing the mechanism in connection with the operations performed.

A blank 15 of bone, wood, or other material, tapered from end to end and square in cross-section, is delivered, large end downward, into a chute 16, which delivers the blanks upon a table 17, on which they are positioned by an adjustable stop 18 and against a flange 19. When thus located, a pair of upper jaws 20 engage the blank and move it off from the table and onto a pair of lower jaws 21, so that the blank is held by the two pairs of jaws, these jaws being mounted on a head 22 supported by posts 23 and 24 mounted in a rocker 25 on a stationary shaft 26, the rocker being provided with a depending arm 27 pivotally connected with a link 28 having a clearance 29, through which the main driving-shaft 30 extends. The said link carries a roller 31 riding in a cam-groove 32 in a cam-plate 33 mounted on the driving shaft 30, and so timed that it will move the posts 23 and the head 22, so as to advance the jaws 20 and 21 to cause the jaws 20 to grasp the blank, as shown in Fig. 5, and push it across the table, so as to be caught by the lower jaw 21 when the blank leaves the edge of the table. The blank is then supported by the two pairs of jaws and moved into line with chuck-jaws 34, which are externally taperd to enter the tapered end 35 of a chuck-spindle 36, the jaws being connected with a chuck-stem 37, which extends through the hollow spindle 36 beyond the inner end of which it extends and where it is provided with a head 38 to form a bearing for a chuck-closing spring 39. Secured to the outer end of the tubular spindle 36 is a bearing-block 40 forming a bearing for the other end of the spring 39. To move the chuck, I employ a lever 41, pivotally mounted on a base 42 and formed at its upper end with a fork 43, the ends of which engage with links 44 pivotally secured to the block 40. Each link is formed with an offset 45 carrying a latch 46, the nose 47 of which is adapted to engage with a pin 48 carried by a backing-plunger 49 carried in bearings 50 and 51 and having a head 52 corresponding to the head 38 with which it aligns. The lever 41 is connected by an adjustable pitman 53 pivoted to a slide 54, reciprocating in bearings 55 in the frame, and carries a roller 56 which is engaged by a cam-rib 57 mounted on a cam-drum 58 on the driving-shaft 30.

The mechanism is so timed that, as the chuck-jaws advance to grip the blank by the forward movement of the lever 41, the upward movement of the links 44, striking lugs 59 on the latches 46, lift the nose 47 of the latches out of engagement with the pins 48, permitting the spring 39 to draw the rod 37 rearward to close the jaws upon the blank. At the same time, the rearward movement of the spring kicks the backing-plunger 49 rearward, as shown in Fig. 7. When the blank is thus held by the chuck, the gripping-jaws 20 and 21 retire, and the blank is advanced and rotated by means of a pulley 60, driven by a belt 61 from a pulley 62 on a counter-shaft 63 driven by a belt 64 over a pulley 65 on the cutter-shaft 66, which also carries a pulley 67 driven by a belt 68 from a pulley 69 on a motor-shaft 70 of a motor 71, or from any other source of supply. The driving-shaft 30 drives a worm-wheel 72 meshing with a worm 73 on a shaft 74 which has a pulley 75 driven by a belt 76 from a pulley 77 on the shaft 66. As the blank advances, it enters a tapered groove 78 in a bearing-block 79, by which it is held against one face of a grinding- or cutting-wheel 80, mounted on the shaft 66, so that, as the blank advances, it will be rounded and tapered, as shown in Fig. 11. The chuck, having advanced to the limit of its forward movement predetermined by the length of the blank, retires, and, as it retires, the latch 46 engages with the pin 48 of the backing-plunger 49, and, sliding over it, is lifted, so as to hook behind it, and, at the same time, the head 38 hits the head 52 and compresses the spring 39, so as to open the jaws 34 and release the blank, which drops into any suitable receptacle, the blanks then being ready to be beaded, pointed and hooked. While this turning operation has taken place, another blank has been fed onto the table, ready to be turned.

It will be understood that the parts are suitably supported, as herein shown, by posts 81.

To regulate the length of throw of the chuck, the lever 41 is formed with a slot 82, in which one end of the adjustable pitman 53 rides, and the pitman 53 is adjustable as to length to limit the forward movement of the chuck.

I claim:

1. In a machine for turning blanks, the combination with a table onto which blanks are fed, means, including a pair of upper gripping-jaws, adapted to engage the blank and move it transversely across the table, a pair of lower gripping-jaws adapted to receive the blank as it leaves the table and, with the upper jaw, firmly support and advance the blank, a rotary, longitudinally-movable chuck adapted to grasp the blank, means for opening and closing the chuck, and a cutter against which the blank is advanced by said chuck.

2. In a machine for turning blanks, the combination with a chuck-spindle having an interiorly-tapered outer end, of a chuck, including tapered jaws adapted to be contracted by the tapered outer end of the chuck-spindle, the jaws being connected with a chuck-stem, formed at its rear end with a head, a block secured to the rear end of said spindle, a spring between said block and head, links connected with said block, a forked lever connected with said links, means for moving said lever and links to advance said spindle, a latch connected with said links, and a backing-plunger with which said latch is adapted to engage and from which it is disengaged by the upward movement of the links as the spindle moves forward to close the jaws upon the blank.

In testimony whereof, I have signed this specification in the presence of two subscribing witnesses.

WILLIAM R. WATROUS.

Witnesses:
S. R. CHARD,
C. C. COLTON.